United States Patent
Talagery et al.

[11] Patent Number: 5,915,218
[45] Date of Patent: Jun. 22, 1999

[54] METHOD AND APPARATUS FOR ROAMER PORT HLR BARRING

[75] Inventors: Gautam Talagery, Dallas; Yojak Vasa, Garland, both of Tex.

[73] Assignee: Ericsson, Inc., Research Triangle Park, N.C.

[21] Appl. No.: 08/856,424

[22] Filed: May 14, 1997

[51] Int. Cl.$^6$ ................................................. H04Q 7/20
[52] U.S. Cl. .......................... 455/433; 455/432; 455/412; 455/434
[58] Field of Search .......................... 455/433, 432, 455/412, 434

[56] References Cited

U.S. PATENT DOCUMENTS

| | | | |
|---|---|---|---|
| 5,142,654 | 8/1992 | Sonberg et al. | 455/433 |
| 5,440,614 | 8/1995 | Sonberg et al. | 455/432 |
| 5,479,484 | 12/1995 | Mukerjee et al. | |
| 5,564,068 | 10/1996 | Nguyen | 455/433 |
| 5,577,103 | 11/1996 | Foti | 455/412 |

FOREIGN PATENT DOCUMENTS

WO 93/11646  10/1993  WIPO.

*Primary Examiner*—Wellington Chin
*Assistant Examiner*—Yemane Woldetatios
*Attorney, Agent, or Firm*—Jenkens & Gilchrist, P.C.

[57] ABSTRACT

A method and apparatus for enabling a call connection between a calling and a called party via a roamer port is disclosed. When a calling party attempts to contact the mobile station via the roamer port, a determination is made as to whether or not the home location register associated with the mobile station accepts calls from the roamer port by accessing the database prior to attempted connections. Upon indicating that the home location register does not accept calls from the roamer port, call connection is discontinued.

9 Claims, 3 Drawing Sheets

METHOD AND APPARATUS FOR ROAMER PORT HLR BARRING

BACKGROUND OF THE INVENTION

1. Technical Field of the Invention

The present invention relates to telecommunications networks, and more particularly, to a method and apparatus for limiting communications between non-cooperating roamer ports and home location registers.

2. Description of Related Art

In the North American Cellular Network (NACN), a mobile subscriber may roam between service areas of competing vendors. Various techniques have been developed to enable a mobile subscriber to continue being provided with mobile telephone services once they have left their home service area. In a first alternative, once a mobile subscriber travels into a new mobile switching center (MSC) coverage area and turns on their mobile station for the first time, the mobile station attempts to register with the servicing MSC for the area by transmitting an associated identification number known as the international mobile subscriber identity (IMSI) number or mobile identification number (MIN). The serving MSC then communicates with the home location register (HLR) associated with the mobile station using the received IMSI/MIN number. This communication is to inform the HLR of the mobile station's new location and to receive requisite subscriber information from the HLR to provide mobile services to the newly registering mobile station.

When a call is made to the roaming subscriber, the calling party dials a cellular number associated with the subscriber and the call is routed to the gateway MSC (GMSC) corresponding to the dialed cellular number. The GMSC queries the HLR of the called subscriber for the roaming location of the called subscriber. The HLR queries the visited MSC where the called subscriber is currently located and requests a temporary routing number which is returned to the HLR and the GMSC. The GMSC uses this temporary number to route the call to the roaming subscriber. If the calling party is located such that the resulting call to the GMSC is a long distance call, the calling party will accrue long distance charges for maintaining a connection to the GMSC of the called subscriber. The called subscriber accrues similar charges when the call is routed back to their roaming location from the GMSC. In a situation where the calling party and the subscriber may be located in the same area, this creates unnecessary expenses.

In order to combat this problem, the concept of the roamer port was developed. The roamer port is a function designed to minimize the long distance charges that a calling party and called subscriber are liable for when the called subscriber is a long distance from his/her GMSC, but a short distance from the calling party. When utilizing a roamer port, a calling party dials a dedicated roamer port telephone number. This connects the calling party to a roamer port that then sends the calling party a dial tone. Upon hearing the dial tone, the calling party dials the subscriber's normal cellular telephone number. The roamer port seizes a signaling trunk to the home location register of the subscriber only for the period of time needed to retrieve a routing number for the subscriber. The signaling trunk with the home location register is then released, and a call is set up locally from the calling party to the roamer port to the roaming subscriber. Thus, the calling party incurs no long distance charges.

Unfortunately, in order for the roamer ports to be effectively utilized, there must be agreements between various service vendors to accept roamer port calls from other service vendors. The possibility exists that a calling party attaching through a roamer port of Vendor A may be attempting to contact a subscriber party having a home location register with Vendor B, but Vendor B does not have an agreement with Vendor A for setup of roamer port calls. When the billing information is collected by Vendor A and sent to Vendor B, Vendor B will refuse to pay for used resources. Vendor B would be considered a non-cooperating vendor. Thus, when the roamer port of Vendor A attempts to contact the HLR of Vendor B, service will be refused and a routing number will not be provided. This delays local paging of the called subscriber by the time involved in signaling the transaction to the non-cooperating HLR belonging to Vendor B.

SUMMARY OF THE INVENTION

The present invention overcomes the foregoing and other problems with a new method and apparatus for interconnecting a calling party to a called subscriber through a roamer port. During setup of the roamer port MSC an indicator in the mobile exchange data indicates which home location registers will accept calls from the roamer port. This information is updated within a database associated with the roamer port containing routing information with regard to all home location registers that may be associated with the roamer port.

Upon receipt of a call connection request between a calling party and the called subscriber, a determination of the home location register associated with the called subscriber is first made. The database containing the routing information is then accessed to determine if the associated HLR is marked as a non-cooperating HLR for roamer port calls. If the HLR is non-cooperating then the call connection is discontinued. If the HLR will accept calls, the switching circuitry associated with the roamer port interconnects the calling party to the called subscriber via the roamer port.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
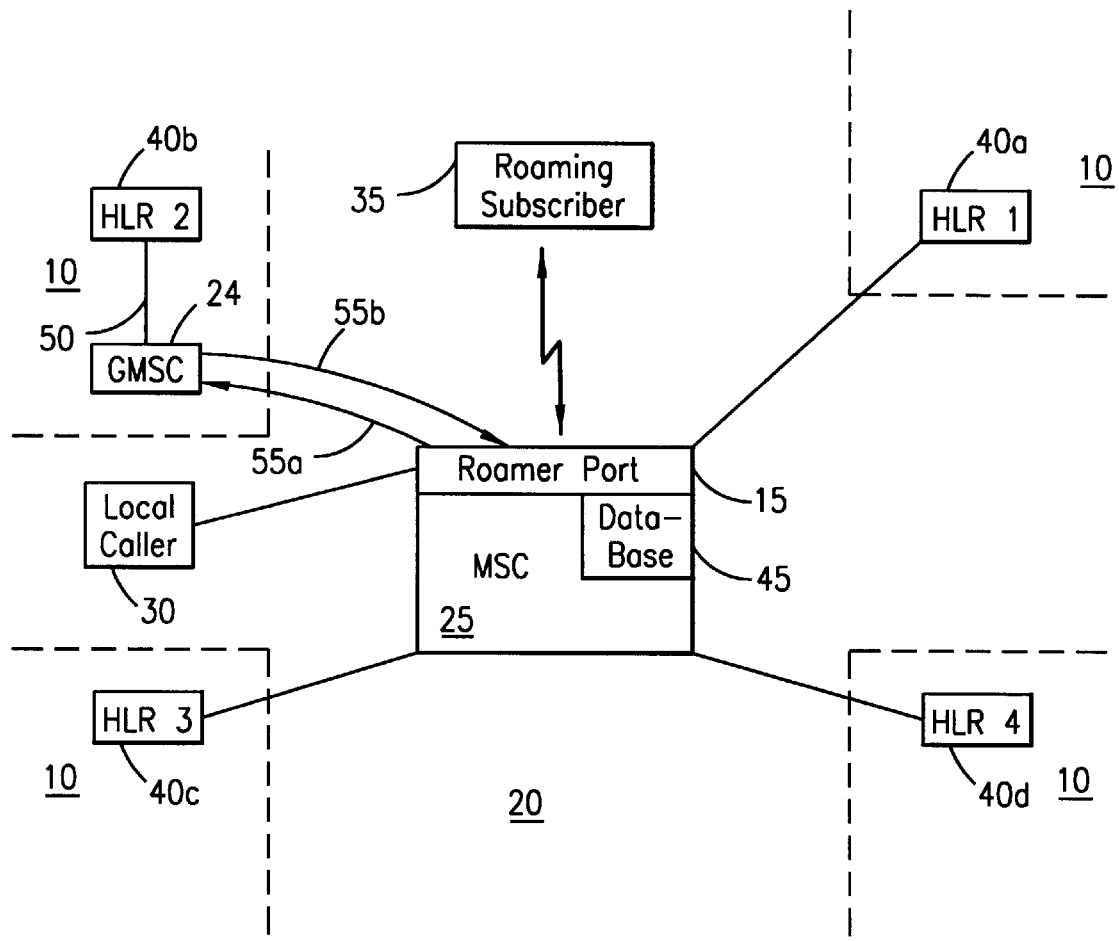
FIG. 1 is an illustration of the interaction between a plurality of vendors, a local caller, a roaming subscriber and a roamer port.

Referring now to the drawings, and more particularly to FIG. 1, there is illustrated a plurality of vendor areas 10 that may or may not be accessed via a roamer port 15 and its associated roamer port area 20. The roamer port 15 comprises part of a mobile switching center (MSC) 25 and serves a particular roamer port area 20 through which a local caller 30 may contact a subscriber 35 locally without using a call connection from the local caller to the GMSC 100 of the subscriber 35 (voice trunk line 55a), and back to the called subscriber (voice trunk line 55b).

If all vendor service providers recognized and provided roaming port calls to the subscribers of all other vendors, then the use of roamer ports would proceed unimpeded. However, certain vendors will not accept roamer port calls from other vendors. Thus, when a roamer port 15 attempts to contact a home location register 40 of a called subscriber 35 that will not accept a roamer port call, the Vendor of roamer port 15 has no way of being reimbursed for the call connection charges that roaming subscriber 35 pays the vendor of HLR 40 as the vendors do not have a prior agreement to setup roamer port calls.

Figure 2:
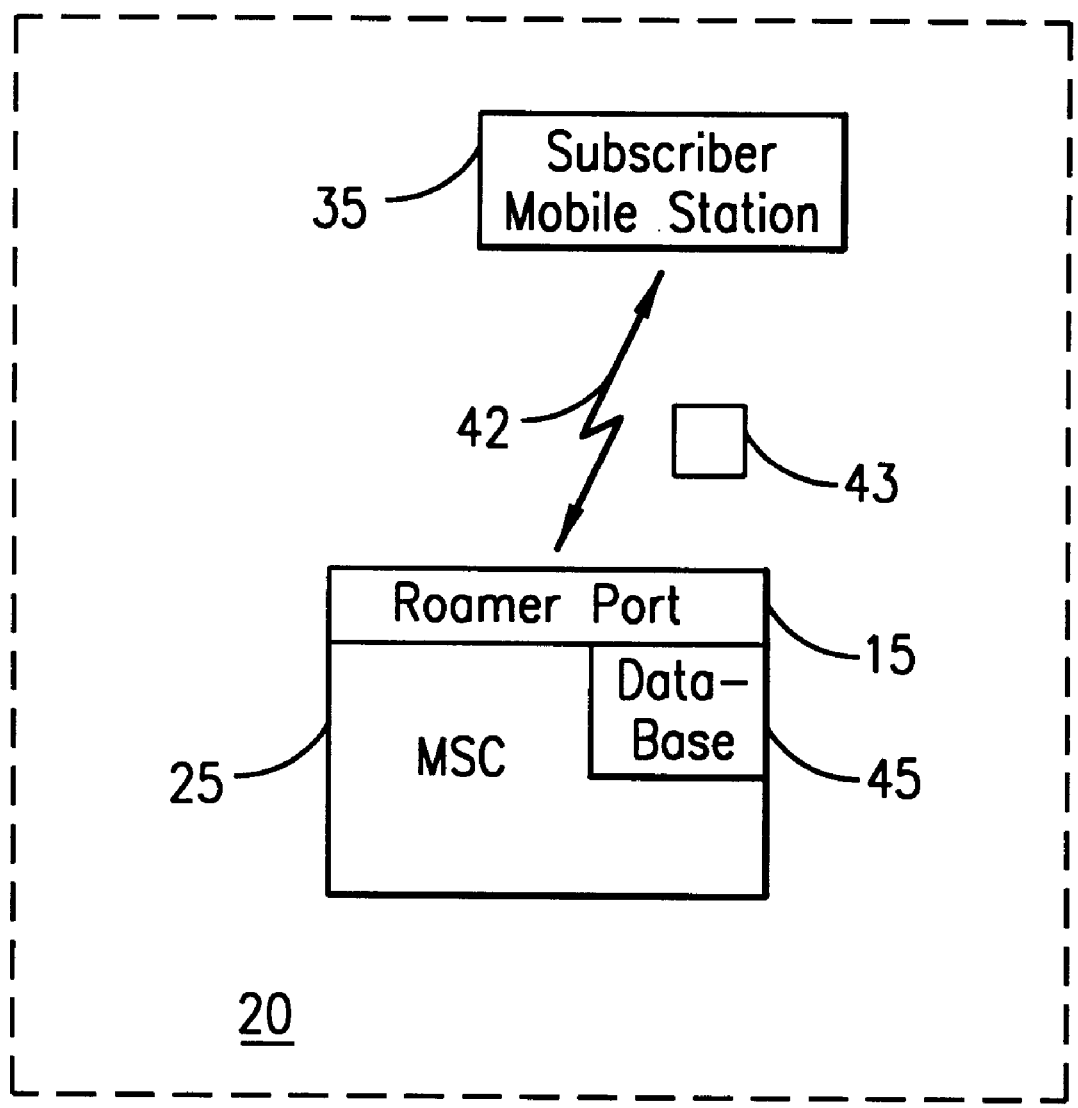
FIG. 2 is an illustration of the interaction between a roaming subscriber and a roamer port.

Each roamer port 15 includes a mobile exchange data database 45 defining routing information for the HLRs 40 that are associated with the roamer port. Prior to/during provision of services to roaming subscribers 35, the vendor operating MSC 25 identifies all HLRs 40 that MSC 25 communicates with. The database 45 is created/updated by the vendor who marks the HLRs 40 as cooperating or non-cooperating based on prior agreements. Referring now also to FIG. 2, there is illustrated the manner in which mobile exchange data is passed between a subscriber 35 entering the roamer area 20 of a roamer port 15. Whenever the subscriber 35 travels into a roamer area 20 serviced by a different MSC 25, a determination is made by the MSC 25 that the mobile station 35 has entered its service area. Thereafter, the MSC 25 attempts to perform a location update procedure with the associated home location register 40 of subscriber 35.

Within the exchange data 42 transferred between the mobile station of the subscriber 35 and MSC 25 will be included the MIN/IMSI 43 of the roaming subscriber 35. The roamer port 15 will determine the identity of the HLR 40 using the MIN/IMSI 43. The mobile exchange data database 45 includes signaling routes to all cooperating HLRs and information on HLR barring to particular home location registers.

For example, in FIG. 1, HLR 1 and HLR 3 do not accept roamer port calls from roamer port 15, while HLR 2 and HLR 4 will accept roamer port calls from roamer port 15. Thus, if local caller 30 attempts to access the mobile station of roaming subscriber 35 through roamer port 15 and the mobile station is associated with HLR 2, the roamer port will set up a connection with home location register 2 via a signaling trunk line 50. The HLR 2 will provide the roamer port 15 with a routing number enabling connection to the mobile station of the local subscriber 35. The connection to HLR 2 is then discontinued, and local caller 30 is connected to mobile station of the subscriber 35 via roamer port 15. Based on prior understanding, HLR 2 40B subsequently reimburses roamer port 15 the charges paid to HLR 2 by the roaming subscriber 35 for call connection.

If on the other hand, the mobile station of the subscriber 35 was associated with non-cooperating HLR 1, this would be immediately determined from the mobile exchange data database 45 and no attempt would be made to contact HLR 1. Thus, call processing would be unsuccessful and discontinued.

Figure 3:
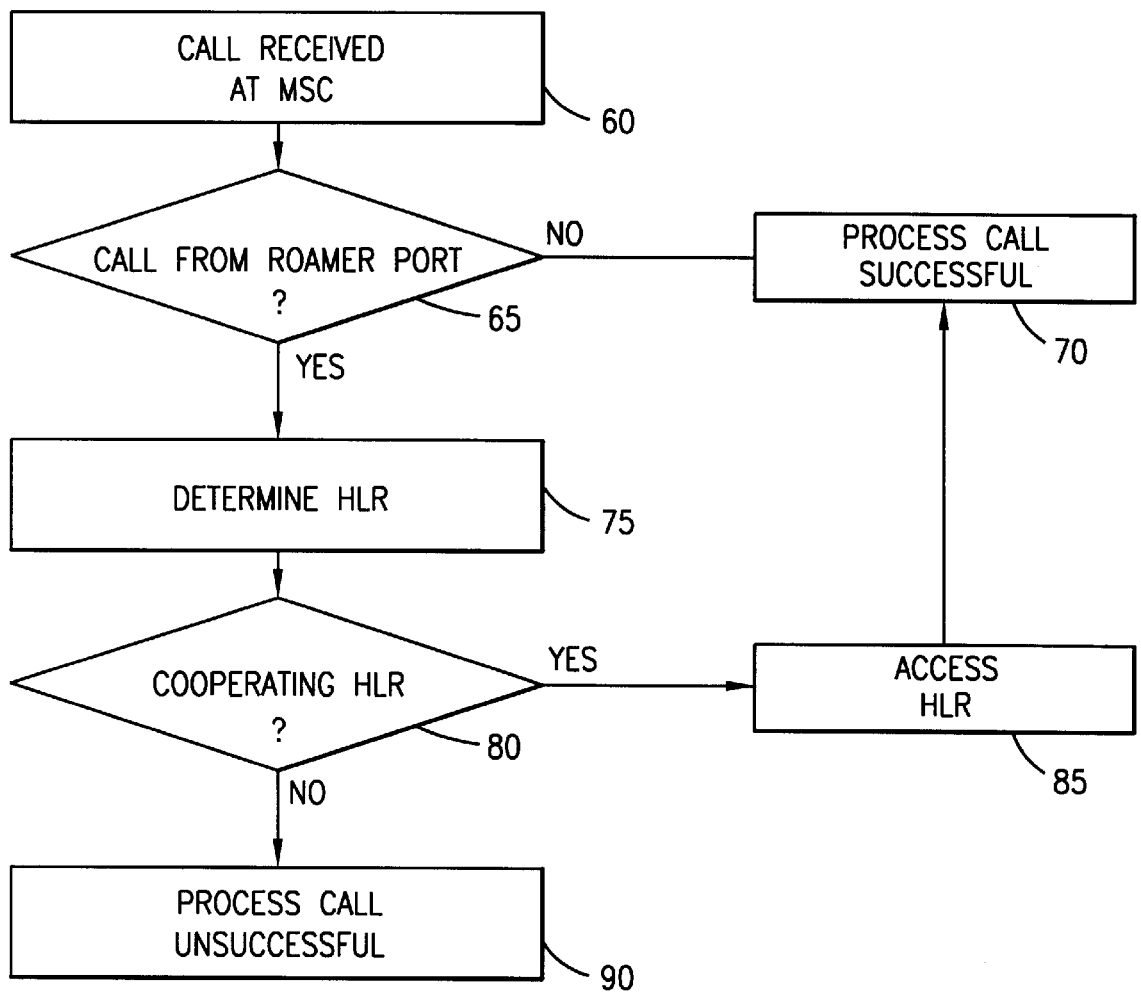
FIG. 3 is a flow diagram illustrating the procedure for call setup to a roamer port including HLR barring functionalities.

Referring now to FIG. 3, there is illustrated a flow diagram generally illustrating the manner for processing a roamer port call from a local caller 30. Initially, at step 60, a call is received at the roamer port 15 of MSC 25 to a roaming subscriber 35. Inquiry step 65 determines if the call has been directed to roamer port 15. If not, the call is processed successfully in the normal manner at step 70. Otherwise, the HLR associated with the roaming mobile station 35 is determined at step 75.

Inquiry step 80 determines if the HLR determined at step 75 is a cooperating or non-cooperating HLR. For cooperating HLRs, the HLR is accessed at step 85 to obtain a routing number and the call is successfully processed at step 70. For non-cooperating HLRs, call connection is not possible, and the call processing is unsuccessful at step 90.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for interconnecting calls through a roamer port, comprising:

receiving at a roamer port an incoming call to a called party from a calling party;

determining a home location register of the called party;

assessing a database at the roamer port containing routing information for the home location register to determine if the home location register accepts calls from the roamer port prior to an attempt to connect to the home location register;

discontinuing call connection between the calling party and the called party if the home location register does not accept calls from the roamer port; and connecting the calling party to the called party through the roamer port if the home location register accepts calls from the roamer port.

2. The method of claim 1 further comprising the step of notifying the roamer port whether the home location register accepts calls from the roamer port.

3. The method of claim 1 further including the step of generating a database at a MSC of the roamer port indicating a connection status of the at least one home location register.

4. The method of claim 2 wherein the step of notifying further comprises the step of reading an indication within the mobile exchange data between the called party and the roamer port defining whether the associated HLR will accept a roamer port call.

5. A method for interconnecting calls between a calling party and a called party through a roamer port, comprising:

receiving at the roamer port an incoming call to the called party from the calling party;

determining a home location register of the called party;

accessing a database containing routing information for the at least one home location register to determine if the home location register accepts calls from the roamer port; and discontinuing call connection between the calling party and the called party if the home location register does not accept calls from the roamer port.

6. The method of claim 5 further comprising the step connecting the calling party to the called party through the roamer port if the home location register accepts calls from the roamer port.

7. The method of claim 5 wherein the step of notifying further comprises the step of reading an indication within the mobile exchange data defining whether the associated home location register will accept a roamer port call.

8. A roamer port for interconnecting a calling party to a called party comprising:

a database for storing routing information indicating whether the at least one home location register accepts calls from the roamer port;

means responsive to a call connection request from the calling party to access the database to determine if a home location register of the called party accepts calls from the roamer port; and switching means responsive to a positive indication from the means responsive to the call connection request for interconnecting the called party to the calling party via the roamer port and responsive to a negative determination from the means responsive to the call connection request for preventing connection between the called party and the calling party via the roamer port.

9. The roamer port of claim 8 wherein the database uses an indicator in mobile exchange data indicating whether a home location register associated with the called party accepts calls from the roamer port.

* * * * *

UNITED STATES PATENT AND TRADEMARK OFFICE
CERTIFICATE OF CORRECTION

PATENT NO. : 5,915,218
DATED : Jun. 22, 1999
INVENTOR(S) : Talagery et al.

It is certified that error appears in the above-identified patent and that said Letters Patent is hereby corrected as shown below:

Column 2, line 63  Replace "100"
With --24--

Column 3, line 31  After "40"
Insert --(FIGURE 1)--

Signed and Sealed this

Twenty-fifth Day of April, 2000

Attest:

Q. TODD DICKINSON

*Attesting Officer*    *Director of Patents and Trademarks*